United States Patent [19]

Schoening

[11] Patent Number: 4,826,652

[45] Date of Patent: May 2, 1989

[54] LOW CAPACITY NUCLEAR REACTOR HOUSED UNDERGROUND IN THE CAVITY OF A CYLINDRICAL PRESSURE VESSEL

[75] Inventor: Josef Schoening, Hambruecken, Fed. Rep. of Germany

[73] Assignee: Hochtemperatur-Reaktorbau GmbH, Fed. Rep. of Germany

[21] Appl. No.: 912,501

[22] Filed: Sep. 29, 1986

[30] Foreign Application Priority Data

Sep. 27, 1985 [DE] Fed. Rep. of Germany ....... 3534422

[51] Int. Cl.⁴ .................... G21C 15/12; G21C 19/28; G21C 5/14
[52] U.S. Cl. .................................. 376/273; 376/265; 376/299; 376/381; 376/458
[58] Field of Search ............... 376/273, 381, 382, 338, 376/295, 296, 355, 918, 299, 458, 265

[56] References Cited

U.S. PATENT DOCUMENTS

| | | | |
|---|---|---|---|
| 2,873,242 | 2/1959 | Treshow | 376/918 |
| 2,975,116 | 3/1961 | Daniels | 376/381 |
| 3,039,945 | 6/1962 | Slack et al. | 376/355 |
| 3,058,897 | 10/1962 | Slack et al. | 376/355 |
| 3,287,910 | 11/1966 | Silverstein | 376/381 |
| 3,294,645 | 12/1966 | Susskind et al. | 376/355 |
| 3,523,062 | 8/1970 | Brown | 376/295 |
| 4,195,457 | 4/1980 | Kissling et al. | 376/296 |
| 4,642,214 | 2/1987 | Zhong | 376/381 |
| 4,661,311 | 4/1987 | Schoening et al. | 376/273 |
| 4,661,313 | 4/1987 | Schoening et al. | 376/296 |
| 4,701,298 | 10/1987 | Schoening et al. | 376/273 |

FOREIGN PATENT DOCUMENTS

| | | |
|---|---|---|
| 1034784 | 10/1959 | Fed. Rep. of Germany . |
| 1646783 | 7/1971 | Fed. Rep. of Germany . |
| 2621358 | 11/1977 | Fed. Rep. of Germany . |
| 3016402 | 11/1981 | Fed. Rep. of Germany . |
| 3335451 | 4/1985 | Fed. Rep. of Germany . |
| 1137939 | 12/1968 | United Kingdom . |

Primary Examiner—Charles T. Jordan
Assistant Examiner—Daniel Wasil
Attorney, Agent, or Firm—Robert J. Koch

[57] ABSTRACT

A low capacity nuclear reactor with spherical fuel elements laid out in an underground configuration and characterized by a compact structure and the far-reaching elimination of active operating installations, such as a charging apparatus, gas purification installations and control systems. The reactor is particularly suitable for generation of heat for heating purposes. The graphite reflector surrounding the pile of fuel elements on all sides includes layers of spherical graphite elements with a diameter equal to that of the fuel elements. The poured part of the graphite reflector and the pile of fuel elements are located in a metal core vessel made of lattice work or perforated sheet metal and capable of supporting the entire weight of the graphite and fuel elements. The mesh or the holes of cage-like core vessel are smaller than the diameter of the spherical elements. Cylinder-like sleeves made of lattice work or perforated sheet metal are fastened to the inner wall of the core vessel, with absorber rods located in a displaceable manner in the sleeves. The core vessel is followed on top by a gas conduction jacket separating the suction and compression part of the cooling gas blower.

14 Claims, 2 Drawing Sheets

LOW CAPACITY NUCLEAR REACTOR HOUSED UNDERGROUND IN THE CAVITY OF A CYLINDRICAL PRESSURE VESSEL

The subject matter contained herein is related to U.S. application Ser. No. 866,921, now U.S. Pat. No. 4,701,298, the disclosure of which is expressly incorporated herein.

BACKGROUND OF THE INVENTION

1. Field of The Invention

The invention relates to a low capacity nuclear reactor housed underground in the cavity of a cylindrical pressure vessel. More particularly, the invention relates to a reactor with a core or pile of spherical fuel elements, a blower forced downward, cooling gas flow, a removable metal core vessel, and a cover closing off the opening of the pressure vessel, wherein the cover is removable for installation and dismantling of the core vessel. The installation also includes a graphite reflector surrounding the pile on all sides and comprising a bottom, side and roof reflector arranged in part within the core vessel, and with a plurality of absorber rods displaceably located in the side reflector.

2. Description of the Related Technology

DE-OS No. 30 16 402 shows a high temperature modular reactor with a metal vessel containing the core of fuel elements located in the cavity of a concrete vessel closed off by a cover. The metal vessel, together with a metal base plate and the bottom, side and roof reflectors may be lifted from the concrete vessel following the shutdown of the reactor, discharge of the spherical fuel elements, dismantling of the control rods and opening of the cover. At least one pipe leading downward is connected to the base plate to remove heated cooling gas, which flows through the pile from bottom to top. The hot gas line leads to a second cavity, located parallel to the first cavity in the concrete vessel and in which a heat consumer, such as a steam generator, is installed. As an alternative to a second cavity, DE-OS No. 30 16 402 further proposes to extend the cavity containing the nuclear reactor downward and to place the heat consumer under the metal vessel.

German Application P No. 35 18 968.1, corresponding to co-pending U.S. Application Serial No. 866,921, discloses a further nuclear reactor. This nuclear reactor has a compact design and a far-reaching elimination of active operation installations, such as a charging apparatus, gas purification means, control systems, and safety systems. It is particularly suitable for the generation of thermal energy for heating purposes. The core vessel containing the pile of spherical fuel elements houses only part of the graphite bottom and side reflectors. Channels are provided in the part of the side reflector located within the core vessel for absorber rods, which serve trimming and shutdown purposes only. The roof reflector rests directly on the stationary pile of fuel elements. The entire core vessel and the components located therein are removed following burnup of the fuel elements. The heat generated in the core is transferred to a cooling system mounted on the inside of a pressure vessel enclosing the nuclear reactor by cooling gas flowing through the pile from top to bottom.

The state of the art further includes the nuclear reactor plant described in DE-OS No. 33 35 451, which relates to a high temperature reactor with spherical fuel elements. In this plant, all of the components of the primary loop, together with the control and shutdown devices are located inside a steel reactor pressure vessel in a manner such that they may be installed and dismantled from above. This enables use of an economical underground location. At least one removal tube is provided under the high temperature reactor for discharge of the fuel elements, said tube leading laterally out of the reactor pressure vessel.

DE No. 1 034 784 shows a gas cooled nuclear reactor with a pile of fuel elements of uniformly shaped bodies and similarly shaped pourable bodies for the reflector jacket.

SUMMARY OF THE INVENTION

It is an object of the invention to provide a pebble-bed nuclear reactor in which active operating devices, such as a charging apparatus, gas purification plant, control systems and safety systems may be disposed of to a great extent, so that replacement of the core vessel and its discharge may be carried out in simpler manner, and the negative effect of the metal core vessel on the neutron economy of the fuel element pebble-bed may be reduced.

The afore-defined object is attained according to the invention by means of the following characteristic elements:

(a) the side reflector comprising a solid outer jacket located outside the core vessel and an inner part located inside the core vessel and containing a pile of spherical graphite elements having the same diameter as the fuel elements;

(b) the roof reflector and the bottom reflector also comprise a pile of spherical graphite elements of the same diameter as the fuel elements, with the graphite elements of the roof reflector resting directly on the fuel elements, which form a stationary pile;

(c) a cage comprising lattice work or perforated sheet metal, open at the top, is provided as the core vessel, with the mesh or holes of the cage smaller than the diameter of the graphite and fuel elements and with the cage capable of supporting the entire weight of the graphite and fuel elements piles;

(d) a plurality of cylindrical sleeves made of lattice work or perforated sheet metal mounted in a uniform distribution on the inside of the cage serving as the core vessel, said sleeves extending over approximately the entire height of the cage and containing the absorber rods, which are provided only for trimming and shutdown purposes;

(e) a closeable opening is provided in the bottom of the core vessel for the removal of burnt fuel elements and graphite elements;

(f) a blower is mounted vertically in a center position on the cover of the pressure vessel.

(g) a gas conduction jacket is set on the top of the core vessel, which separates the suction and compression sides of the blower in the free space above the roof reflector.

The use of spherical, i.e., pourable, elements not only for the active core zone, but also for the inner part of the side reflector and the bottom and roof part of the graphite reflector surrounding the active core zone, renders the removal of the graphite reflector from the core vessel following the extraction of the core vessel from the nuclear reactor much easier. In contrast to the configurations used heretofore, the core vessel is not made of a solid material, but of perforated sheet metal or a metal lattice, whereby two essential advantages are attained. The weight of the core vessel is significantly reduced, which is important in view of its removal, and the effect of the metal core vessel as a neutron absorber is diminished.

The nuclear reactor according to the invention is further characterized by its compact structural configuration and it is protected against external effects (aircraft crashes, pressure waves, sabotage, etc.) and accidents in the conventional part (piping fractures, etc.) by its underground placement. In addition, the surrounding soil provides excellent shielding against radioactive radiation.

This simple and economical concept yields a power capacity of approximately 10 to 20 MW. Higher power capacities may be obtained by a multiplication of the unit reactor. All necessary accessory devices are provided only once in order to further improve the economy of the reactor.

This simple configuration keeps the cost of generating energy low enough so as to be able to compete with the present fossil fuels.

The stationary fuel element pile makes power operation for approximately 10 to 40 years possible. After this, the fuel elements, together with the core vessel, the graphite pebbles, and the trim and shutdown rods are replaced. Apparatus for continuous and discontinuous charging may be eliminated. The subcriticality of the fuel elements in the core vessel during the in and out movement is assured by the retention of the trim and shutdown rods in the core vessel. The possibility of removing the core vessel with its associated components extends the life of the entire plant, as the highly stressed structural parts, such as the inner side and roof reflectors, may be simply replaced.

The cooling gas, preferably helium, is transported by the blower, the rotor of which projects into a free space between the cover of the pressure vessel and the roof reflector, from top to bottom through the pile of fuel elements. After passing through the pile, the cooling gas is distributed over the bottom of the pressure vessel and then flows in an annular space between the core vessel and the inside of the pressure vessel in an upward direction. It then flows along the outside on a gas conduction jacket and re-enters the blower.

Advantageous further developments of the invention will become apparent from the claims and the description below of an embodiment with reference to the schematic drawings.

DETAILED DESCRIPTION OF THE PREFERRED EMBODIMENT

Figure 1:
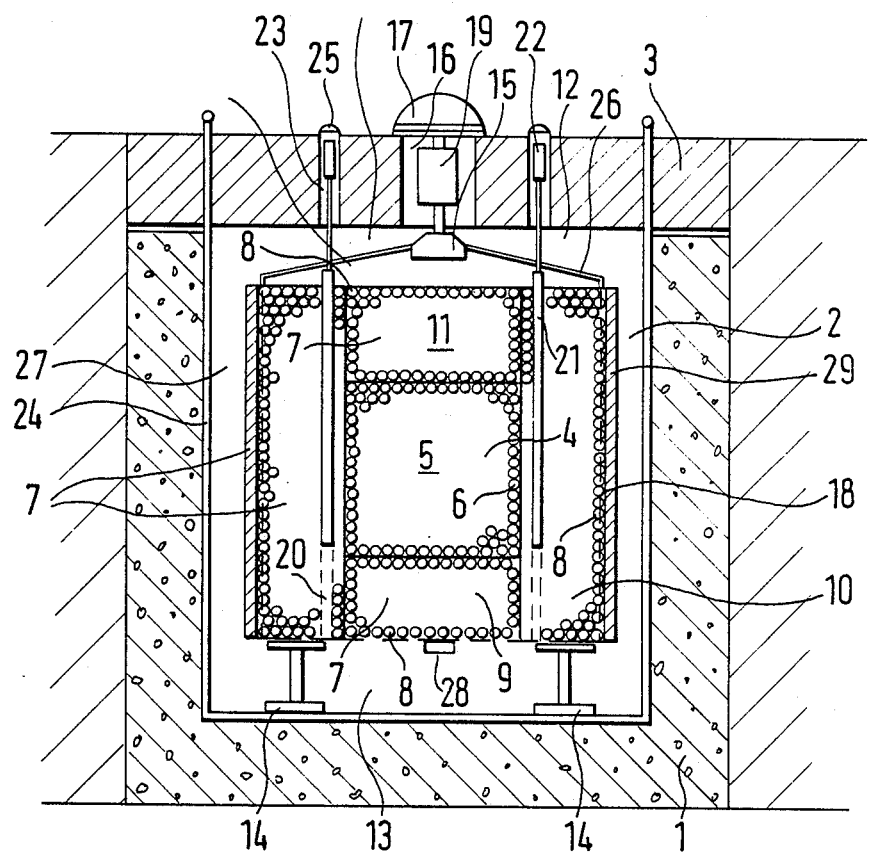
FIG. 1 shows a longitudinal section through a nuclear reactor according to the invention.

As seen in FIG. 1, an underground cylindrical pressure vessel 1 of reinforced concrete encases a cavity 2. A removable cover 3 closes off the opening of the pressure vessel. A nuclear reactor 4 with a stationary cores (also referred to as piles or pebble-beds) of spherical fuel elements 6 is housed in the cavity 2. The fuel elements 6, which are manufactured by the hot or cold press method, comprise a heavy metal load, enabling extended retention time in the core.

The core 5 is enclosed on all sides by a graphite reflector 7. The reflector includes a large proportion of spherical pure graphite elements 8 arranged in a pile. The graphite elements 8 may have the same diameter as the spherical fuel elements 6. The graphite reflector 7 has a solid, outer reflector jacket 29, an inner portion 10 comprising the graphite pebbles 8, a bottom reflector 9 of graphite pebbles 8, and a roof reflector 11, also made of graphite pebbles 8. The roof reflector graphite pebbles 8 rest directly on the fuel elements 6. A free space 12 is located between the roof reflector 11 and the cover 3. Another free space 13 is provided between the bottom reflector 9 and the bottom of the pressure vessel 1. This space contains a metal support structure 14 for supporting the nuclear reactor 4 on the bottom of the pressure vessel.

A cooling gas, preferably helium, flows downward through pile 5 of fuel elements. The gas is circulated by a blower 15. The blower 15 is mounted in a centered position on the bottom side of the cover 3 with its rotor located in the free space 12. The drive motor 19 for the blower 15 is installed in a passage 16 of the cover 3, said passage being equipped with an external closure part 17. This facilitates the maintenance of the motor and the blower.

The fuel element pile 5 is enclosed laterally and on the bottom by a metal core vessel 18, which also houses the entire poured graphite reflector 7, i.e., the solid outer jacket 29 is located outside the core vessel 18. The core vessel 18 has the configuration of a cage open at the top, the cylindrical side wall and bottom of which consist of lattice work or perforated sheet metal. It is capable of supporting the entire weight of the graphite pebbles 8 and the fuel elements 6. The mesh of the lattice or the holes of the sheet metal are dimensioned so that no graphite pebbles 8 may leave the cage. The bottom of the core vessel 18 exhibits a closeable opening 28, through which the fuel elements 6 and the graphite pebbles 8 may be removed.

A plurality of uniformly distributed cylindrical sleeves 20 may be mounted on the inner wall of the core vessel 18. The sleeves are made of the same mesh or perforated sheet metal, extending approximately over the entire height of the core vessel 18 and serving as vertical channels for the absorber rods 21. The absorber rods 21 are located displaceably in the sleeves 20. The driving means 22 for the absorber rods 21 are located in passages 23 of the cover 3. The passages 23 are closed off by covers 25.

The absorber rods 21, which thus are located inside the side reflector 10, are intended only for trimming or shutdown purposes. The reactor output regulates exclusively the speed of the blower 15 and the secondary flow of a cooling system (described below), utilizing the stabilizing property of the negative temperature coefficient. Active controls by the absorber rods 21 may therefore be eliminated.

The trim and shutdown rods 21 in combination with burnable neutron poisons (for example, gadolinium) serve to bind any excessive initial reactivity. The variations of excess reactivity occurring during the operation of the reactor are compensated by the displacement of the trim and shutdown rods 21. In the process, the trim and shutdown rods 21 are displaced gradually and intermittently manually or by hand. No regulation or automation is necessary for these slow reactivity variations. Short term fluctuations of the fuel element temperatures are tolerated in view of the high temperature strength of the ceramic elements 6 over a relatively wide range without difficulty.

The core vessel 18 together with the graphite reflector 7 (with the exception of the solid outer jacket 29), the fuel element 6, and the absorbers 21 may be removed following the removal of the cover 3, in the upward direction. A shielding bell may be used in the process. The absorber rods 21 assure the subcriticality of the pile 5 in the course of the installation and removal process. The core vessel 18 is removed when the fuel elements 6 are sufficiently burned up.

A cooling system 24 is mounted over the entire inside of the pressure vessel 1. The system may preferably comprise pipes through which cooling water flows which are laid out so that the heat generated by the pile 5 can be safely removed, both in power operation and when removing the decay heat. The gas pressure in the primary loop is higher than the pressure of the medium in the cooling system 24 in order to prevent intrusion of water into the primary loop.

A gas conduction jacket 26 is provided in the free space 12 to separate the suction and compression side of the blower 15. It is connected with the upper end of the core vessel 18.

The reactor output is regulated exclusively by the speed of the blower 15 and the secondary flow of the cooling system 24, wherein the negative temperature coefficient inherent in the pebble-bed reactor is utilized. The blower 15 suctions the cooling gas, the pressure of which, in normal operation, is approximately 8 to 10 bar, from the free space 12 and transports it into the pile 5. In the course of the coolant gas flow through the pile, the temperature of the gas increases from approximately 300° C. to 500° C. The heated cooling gas enters the free space 13 through the bottom reflector 9, where it is distributed and conducted into an annular space between the inside of the pressure vessel and the core vessel 18. From here the cooled gas flows along the outside of the gas conduction jacket 26 to the blower 15.

The absence of water carrying components in the primary loop and the fact that no fuel elements 6 are added in the course of the operation, together with the condition that no impurities are passed in the primary loop in any other manner, enable the elimination of gas purification installations. Furthermore, no charging apparatus, reactor protection systems or active control systems are required for the nuclear reactor 4 and therefore are not provided. Consequently, the nuclear reactor 4 has very low energy production costs and the required maintenance effort is low.

The decay heat developed in the nuclear reactor 4 may be removed securely even in case of accidents.

In case of a failure of the blower 15, the decay heat is removed by natural convection to the cooling system 24. The direction of the flow of cooling gas in the fuel element pile is reversed. This does not, however, result in a risk of overheating the blower 15 and its drive motor 22. A potential pressure rise in the primary loop may either be taken into account in the layout of the primary loop or compensated for by the flow of the cooling gas into gas reservoirs. The cooling system 24 is laid out so that a volume of the cooling medium sufficient for the removal of the decay heat is circulating through the pipes of the cooling system 24.

In the case of a pressure release accident the decay heat is again transferred to the cooling system 24 by heat conduction through the graphite reflector 7 and by thermal radiation by the graphite reflector 7 to the cooling system 24. Here again the temperatures prevailing in the core of the reactor 4 during normal operation are not significantly exceeded.

Even if the cooling system 24 fails, the decay heat is safety removed without damage to the fuel elements or the release of activity from the fuel elements 6. Decay heat removal in this case is effected by conduction through the pressure vessel 1 into the surrounding ground and into the atmosphere. If a steel or prestressed concrete vessel is used as the pressure vessel 1, the conduction of heat may be favorably affected by the specific layout of the steel reinforcements. The simple configuration renders only a very slight surveillance effort necessary.

Figure 2:
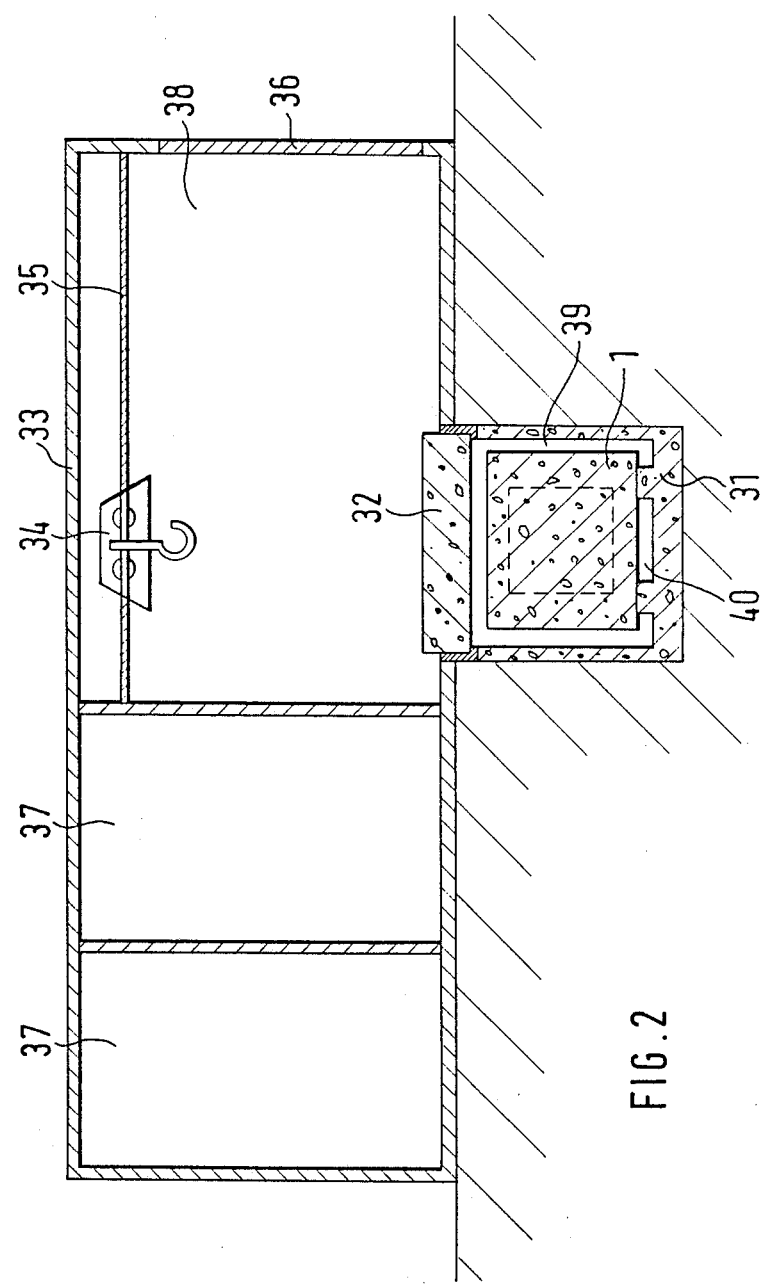
FIG. 2 shows the entire plant with its above-ground structure.

FIG. 2 shows the entire nuclear reactor plant with the pressure vessel 1 resting on a foundation 31 arranged underground in a cavity 40 with a concrete cover 32 and a hall 33 built of light structural components. The concrete cover 32 protects the nuclear reactor 4 in combination with its placement underground against external effects. The hall 33 comprises a door 36 and is divided into a workshop and operating room 37 and a room 38 for the installation and removal of the core vessel 18. Rails 35 upon which a crane 34 runs are provided in room 38 for this purpose. The cavity 40 is lined with concrete. The intermediate space 39 between the wall of the cavity and the pressure vessel 1 is monitored for leakage and activity. A slightly reduced pressure may be established optionally with respect to the environment. Potential leakages are removed discontinuously in a programmed manner.

I claim:

1. An underground nuclear reactor comprising:
    a cylindrical pressure vessel;
    a stationary pile of splerical fuel elemetns located within a removable metal core vessel, said removable vessel being arranged within a cavity defined by said cylindrical pressure vessel;
    a solid, outer, side reflector jacket laterally disposed aganist an external surface of said removable core vessel;
    an inner reflector comprising a plurality of spherical graphite elements within said removable metal core vessel and surrounding said pile;
    a bottom reflector of spherical graphite elements located within said removable metal core vessel and beneath said pile of fuel elements;
    a roof reflector of spherical graphite elements resting directly on said pile of fuel elements within said removable metal core vessel;
    a pluralilty of tubular sleeves arranged in said inner reflector;
    a plurality of absorber rods displaceably arranged within said sleeves;
    wherein said removable metal core vessel is an upwardly open cage having a mesh or a plurality fof holes of limited dimensions so as to prevent passage of said fuel elements and spherical graphite elements therethrough, and is of a construction sufficient to support said graphite and fuel elements; and
    a removable cover mounted in an opening in said cylindrical presusre vessel of sufficient dimensions to enable installation and removal of said core vessel therethrough;

2. A nuclear reactor according to claim 1, wherein said plurality of tubular sleeves have a mesh or holes of limited size so as to prevent passage of said fuel elements therethrough.

3. A nulcear reactor according to claim 1, further comprising:
a closeable opening for removing burnt-up fuel elements and graphite elements, said opening being located in a bottom portion of said removable metal core vessel.

4. A nuclear reactor according to claim 1, further comprising:
blower means mounted on said cover for forcing cooling gas in a primary loop downwardly through said pile of spherical fuel elements; and
a gas conduction jacket associated with said blower means, said jacket being located in a free space above said roof reflector and defining a blower compression area and a blower suction area.

5. A nuclear reactor according to claim 1, wherein said fuel elements have a heavy metal load for extended retention time in a core of said fuel elements.

6. A nuclear reactor according to claim 4, further comprising;
cooling system means mounted on an inner surface of said pressure vessel for removing heat generated by said pile of spherical fuel elements.

7. A nuclear reactor according to claim 6, further comprising;
a cooling medium within said cooling system means; and
means for maintaining a gas pressure in said primary loop higher than a cooling medium pressure in said cooling system means.

8. A nuclear reactor according to claim 1, further comprising;
cooling system means mounted on an inner surface of said pressure vessel for removing heat generated by said pile of spherical fuel elements under normal operaitng conditions and for removing decay heat under emergency operating conditions.

9. A nuclear reactor according to claim 1, further comprising;
a plurality of first passages aligned with said tubular sleeves and arranged in said cover;
a plurality of means for covering said first passages;
a plurality of means for driving said plurality of absorber rods arranged in said first passages;
a second, centrally-located passage in said cover;
means for covering said second passage;
a blower means for forcing cooling gas in a primary loop downwardly through said pile of spherical fuel elements;
means for driving said blower means arranged in said second passage.

10. A nuclear reactor according to claim 1, further comprising:
foundation means for supporting said cylindrical pressure vessel;
means for covering said pressure vessel resting on said foundation means; and
as hall enclosing said means for covering and for housing auxiliary and supply systems.

11. A nuclear reactor as in claim 1, wherein spherical elements in said bottom reflector are of a same diameter as said spherical fuel elements.

12. A nuclear reactor as in claim 1, wherein spherical elements in said inner reflector are of a same diameter as said spherical fuel elements.

13. A nuclear reactor as in claim 1, wherein spherical elements in said roof reflector are of a same diameter as said spherical fuel elements.

14. A nuclear reactor as in claim 1, wherein said plurality of sleeves are mounted in a uniform distribution over said removable metal core vessel.

* * * * *